(12) United States Patent
Schwarze et al.

(10) Patent No.: US 11,486,468 B2
(45) Date of Patent: Nov. 1, 2022

(54) GEAR FOR A GEAR TRAIN

(71) Applicant: ZF Friedrichshafen AG, Friedrichshafen (DE)

(72) Inventors: Rene Schwarze, Vörden (DE); Christian Stephan, Hille (DE); Marc Schieß, Hohenfels (DE); Ulrich Mair, Friedrichshafen (DE); Lars Schories, Tettnang (DE); Karl Benkler, Garmisch-Partenkirchen (DE); Carsten Stamm, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 155 days.

(21) Appl. No.: 16/613,131

(22) PCT Filed: Apr. 26, 2018

(86) PCT No.: PCT/EP2018/060786
§ 371 (c)(1),
(2) Date: Nov. 13, 2019

(87) PCT Pub. No.: WO2018/215162
PCT Pub. Date: Nov. 29, 2018

(65) Prior Publication Data
US 2020/0217413 A1    Jul. 9, 2020

(30) Foreign Application Priority Data
May 24, 2017   (DE) ...................... 10 2017 208 800.1

(51) Int. Cl.
F16H 1/28 (2006.01)
F16H 57/08 (2006.01)
F16H 57/12 (2006.01)

(52) U.S. Cl.
CPC ........... F16H 1/2863 (2013.01); F16H 57/08 (2013.01); F16H 2057/127 (2013.01)

(58) Field of Classification Search
CPC ........ F16H 55/18; F16H 1/2863; F16H 57/12; F16H 57/08; F16H 2057/127; B60G 21/055; B60G 2204/41; B60G 2204/4191
See application file for complete search history.

(56) References Cited

U.S. PATENT DOCUMENTS 4,189,951 A   2/1980 Sauter
9,482,334 B2  11/2016 Buchleitner et al.
(Continued)

FOREIGN PATENT DOCUMENTS

CN            2729432 Y      9/2005
DE   10 2005 041 357 A1     4/2006
(Continued)

OTHER PUBLICATIONS

German Office Action Corresponding to 10 2017 208 800.1 dated Feb. 14, 2018.
(Continued)

*Primary Examiner* — Ernesto A Suarez
*Assistant Examiner* — Lori Wu
(74) *Attorney, Agent, or Firm* — Finch & Maloney PLLC

(57) ABSTRACT

A gearwheel for a gear system for a planetary gear system of a chassis assistance system. The gearwheel is divided into at least a first spur gear and a second spur gear which are spaced apart from one another along a common rotational axis. The gearwheel has, in addition, an open spring ring with a first end, which is supported in a circumferential direction against the first spur gear, and a second end, which is supported in the direction opposite to the circumferential direction against the second spur gear in such manner that by rotating the spur gears, relative to one another about the common rotational axis, the spring ring can be stressed in order to exert a restoring torque on the spur gears. A recess is formed on at least one of the spur gears for holding part of the spring ring.

16 Claims, 5 Drawing Sheets

(56) References Cited

U.S. PATENT DOCUMENTS

| | | |
|---|---|---|
| 10,330,188 B2 | 6/2019 | Koch et al. |
| 2013/0150205 A1 | 6/2013 | Wu et al. |

FOREIGN PATENT DOCUMENTS

| | | | |
|---|---|---|---|
| DE | 10 2007 006 470 A1 | 1/2008 | |
| DE | 10 2011 122 136 A1 | 6/2013 | |
| DE | 10 2014 101 111 A1 | 8/2014 | |
| DE | 10 2015 202 236 A1 | 8/2016 | |
| DE | 10 2015 206 063 A1 | 10/2016 | |
| DE | 10 2016 207 966 A1 | 11/2017 | |
| EP | 1 837 558 A1 | 9/2007 | |
| EP | 2 894 374 A1 | 7/2015 | |
| JP | H02129434 * | 5/1990 | ........... F16H 1/2863 |
| RU | 2 020 338 C1 | 9/1994 | |

OTHER PUBLICATIONS

International Search Report Corresponding to PCT/EP2018/060786 dated Aug. 8, 2018.
Written Opinion Corresponding to PCT/EP2018/060786 dated Aug. 8, 2018.

* cited by examiner

GEAR FOR A GEAR TRAIN

This application is a National Stage completion of PCT/EP2018/060786 filed Apr. 26, 2018, which claims priority from German patent application serial no. 10 2017 208 800.1 filed May 24, 2017.

FIELD OF THE INVENTION

The invention relates to a gearwheel for a gear system.

BACKGROUND OF THE INVENTION

In various sectors of technology planetary transmissions are used, which are so-termed epicyclic transmissions, i.e. transmissions which besides a shaft fixed to a housing also have axes which revolve around a circular path in the housing. In planetary transmissions the revolving axes extend parallel to the shaft fixed to the housing, so that the gearwheels rotating about the revolving axes orbit around a central wheel—just as planets orbit around the sun.

In automotive technology planetary transmissions have various applications. To increase the stability of the vehicle and improve driving comfort it is known as such to equip vehicles with a so-termed roll stabilizer. In its simplest version this is an essentially C-shaped torsion bar spring which in its central area is mounted on the vehicle body and whose outer, opposite ends are in each case connected to a wheel suspension. By virtue of this design the roll stabilizer ensures that when cornering, the body of the vehicle does not move down only on the outside of the curve (due to centrifugal force), but also the wheel on the inside of the curve drops somewhat (copying behavior).

To increase the driving comfort further it is also known from the prior art to make such roll stabilizers adjustable. For this the roll stabilizer comprises an actuator and is divided into two stabilizer halves that can be rotated relative to one another by means of the actuator. By rotating the stabilizer halves relative to one another, rolling movement of the vehicle body is produced in a controlled manner or rolling movement caused by external factors is counteracted in a controlled manner. Roll stabilizers are known, in which an electric motor serves to power the actuator. To be able to reduce the size of the electric motor, in such roll stabilizers it is usual to use a mechanical gear-train, particularly one configured as a planetary gear system (or a plurality of planetary gear systems arranged in stages one after another) for stepping up the torque or rotational speed of the electric motor.

In a manner known in its own right, such planetary gear systems essentially comprise a centrally arranged sun gear, a set of planetary gears and a ring gear. The planetary gears, each in the form of a gearwheel, are each mounted to rotate about a rotational axis of their own relative to a planetary carrier. All the planetary gears mesh with and rotate around the centrally arranged sun gear. At the same time the planetary gears mesh with and roll around an outer ring gear, which in the application case of a roll stabilizer is usually fixed relative to the housing, i.e. it is made as part of the housing of the actuator.

Depending on the transmission stage concerned, in certain operating situations high torques are transferred within a planetary gear stage. Furthermore, in certain operating situations of the vehicle load changes take place within the planetary gear system. Because of these requirements planetary gear systems used in roll stabilizers use special gearwheels as planetary gears. DE 10 2015 206 063 B4 describes a gearwheel according to the preamble of claim 1 thereof. The gearwheel described and shown therein serves as one of a plurality of planetary gears within a planetary carrier and is therefore part of the drive-train of a roll stabilizer. As can be seen in FIG. 7 of the document, the gearwheel is divided into a first spur gear and a second spur gear, which together form a pair. The pair of spur gears is arranged on a common rotational axis, with the first and second spur gears an axial distance apart from one another. Furthermore, the gearwheel has an open spring ring arranged axially between the two spur gears. The spring ring has a first end, which is supported in a circumferential direction relative to the first spur gear by a ridge formed on the latter, and a second end which is supported in the opposite direction relative to the second spur gear by a ridge formed thereon. By virtue of this arrangement, by rotating the spur gears relative to one another about the common rotational axis the spring ring can be stressed so that it exerts a restoring torque on the spur gears. Thus, rotation of the spur gears relative to one another produces a pre-stress which, in the fitted condition of the gearwheel within the planetary gear system, advantageously ensures that opposed flanks of the two spur gears remain in contact without play against the mating flanks of the meshing teeth of the outer ring gear and/or the inner sun gear. Accordingly, stressing of the spur gears relative to one another brings about a reduction of play within the planetary gear stage.

In the gearwheel previously known from DE 10 2015 206 063 B4, it is a disadvantage that the gearwheel has a comparatively large axial thickness. This is because of the ridges on the spur gears projecting in the axial direction, which demand extra axial fitting space. Besides, forming the ridges during the production of the spur gears entails machining away a substantial amount of material.

SUMMARY OF THE INVENTION

The object of the present invention is to indicate a gearwheel of the type being spoken of, which entails less machining for its production compared with the gearwheel known from the prior art, and which can be fitted more compactly.

This objective is achieved by a gearwheel having the characteristics specified in the independent claim(s). It is a gearwheel for a gear-train, in particular for a planetary gear system, which is divided into at least a first spur gear and a second spur gear. The spur gears are axially a distance apart from one another on a common rotational axis, and the gearwheel also comprises an open spring ring. Associated with the spring ring is a first end, which is supported in a circumferential direction relative to the first spur gear, and a second end, which is supported in the direction opposite to the circumferential direction, relative to the second spur gear. The support is designed such that by rotating the spur gears relative to one another about the common rotational axis the spring ring can be stressed in order to exert a restoring torque on the spur gears. According to the invention it was recognized that the axial size of the gearwheel can advantageously be reduced by forming on at least one of the spur gears a recess for the partial accommodation of the spring ring. Notwithstanding the design known from DE 10 2015 206 063 B4, in which the spring ring arranged between the two spur gears enlarges the axial size of the gearwheel virtually by its own axial thickness, the recess formed according to the invention in at least one of the spur gears ensures that the spring ring held at least partially or—if there are recesses opposite one another in both of the spur gears—in sum reduces the size even completely. The axial extension of the gearwheel is thereby reduced advantageously. The useful tooth flank width is thus increased relative to the axial size of the gearwheel, which has an overall positive effect having regard to the high torques to be transmitted.

In the gearwheel the spring ring already mentioned is expediently arranged axially between the first spur gear and the second spur gear.

The recess provided according to the invention for the partial accommodation of the spring ring can be designed in various ways. Expediently, it holds at least one end of the spring ring and has a contact surface against which the end of the spring ring held is supported.

To ensure a secure seating of the spring ring in various operating situations, the contact surface can advantageously be pocket-shaped in order to hold the preferably lug-shaped end of the spring ring that fits into it. In this way, thanks to the pocket-shaped form of the contact surface a form-enclosing fit is advantageously formed between the spur gear and the spring ring, which prevents slipping of the spring ring particularly in the radial direction.

Preferably, the contact surface has a radius equal to or at least slightly larger than a radius of the preferably lug-shaped end of the spring ring. If the radii of the pocket formed by the contact surface and the lug-shaped end of the spring ring are equal, a large contact surface area is formed, whereby advantageously the surface pressure on the material of the spur gear and/or the spring ring is only small. If, alternatively, the radius of the pocket is chosen as at least slightly larger than the radius of the lug-shaped end of the spring ring, it is ensured that under load—and when accordingly deformed—the spring ring can roll in a linear manner (i.e. forming a linear contact) on the pocket-shaped contact surface of the spur gear. If the contact is only linear, the areal friction and hence the stick-slide risk ("stick slip") between the spur gear and the spring ring is reduced.

According to an advantageous further development of the gearwheel, the recess has the shape of a circular arc. Since the open spring ring is also of circular shape, the recess can accommodate the open spring ring at least in part so that the spring ring to a large extent fills the recess.

Advantageously, to enable their mounting on a common rotational axis, in particular on a bearing bolt that passes axially through the spur gears, the spur gears each have an opening which is preferably approximately cylindrical.

According to an advantageous further development of the invention, in relation to the radial extension of the spur gear the recess is immediately adjacent to the preferably approximately cylindrical opening. Thus, in this case the recess is formed in a radially inner area of the spur gear, whereby in an advantageous manner the tooth base of the spur gear is not, or hardly at all weakened by the recess.

Since according to a further advantageous development of the gearwheel the spring ring has a smaller inside diameter than the opening made in the spur gears, the spring ring—besides its function of producing a restoring torque—can also be useful for axially securing, in particular, one of the roller bearings on which the spur gears are mounted.

According to a further advantageous development of the invention, the recess can be in the form of a groove made in the material of the spur gear. A groove has the advantage that the spring ring can be supported both radially on the inside and also radially on the outside against the respective groove walls.

Entirely independently of the other design features of the gearwheel, it can be provided that the recess has an axial depth that remains constant all along its length. A recess with a constant axial depth along its length is advantageous particularly from the standpoint of production technology, since it can be produced with little complexity and therefore inexpensively.

Alternatively it can be provided that starting from the contact surface for the spring ring end concerned, the recess has a preferably smoothly decreasing axial depth in the manner of a ramp. Particularly when the spring ring has an axial gradient, this can then be at least partially supported flat in the axial direction against the corresponding spur gear. With regard to its circumferential course the spring ring used in the gearwheel can be designed in various ways. In an advantageous embodiment it comprises less than a complete turn. Relative to the rotational axis the two ends of the open spring ring are apart from one another by less than 360° along the curve.

Alternatively, the spring ring conceivably consists of more than one turn, preferably about one and a half turns. Relative to the rotational axis the two ends of the open spring ring are apart by around 540° along the curve. Expediently, with more than one turn the spring ring has an axial gradient.

According to an advantageous further development of the gearwheel, in its relaxed condition the spring ring has quite generally an axial gradient so that when the gearwheel is fitted, particularly in the housing of a planetary carrier of a planetary gear system, for the purpose of compensating for any play, the spur gears are pushed apart and/or tilted, relative to the common rotational axis, toward it. Thus, in this design the spring ring has a further function; it serves to compensate for play when the gearwheel is fitted. This can be play in the circumferential direction, the axial direction and/or the radial direction.

BRIEF DESCRIPTION OF THE DRAWINGS

Below, the invention is explained with reference to embodiments illustrated in the drawings, from which further advantageous effects of the invention also emerge. The drawings show.

DETAILED DESCRIPTION OF THE PREFERRED EMBODIMENTS

Figure 1:
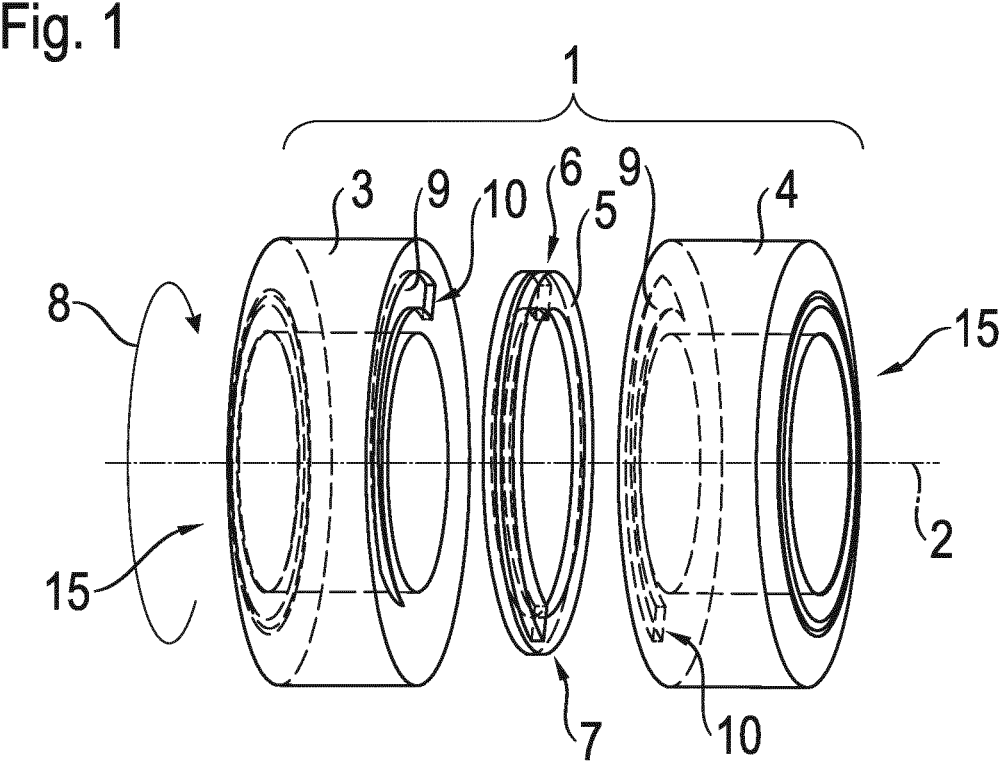
FIG. 1: An exploded representation of a gearwheel for a planetary gear system, according to a first embodiment of the invention.

FIG. 1 shows an exploded representation of a gearwheel 1 according to a first embodiment of the invention. The gearwheel 1 consists of a first spur gear 3 and a second spur gear 4 a distance apart from one another along a common rotational axis 2. Each of the two spur gears 3, 4 has outer teeth (not shown). In a fitted condition of the gearwheel 1, the spur gears 3, 4 can in particular mesh with a sun gear and a ring gear of a planetary gear system. Besides the spur gears 3, 4 the gearwheel 1 also comprises an open spring ring 5. In the first embodiment shown, the spring ring 5 has one and a half turns and accordingly a first end 6 of the spring ring 5, along the circular-curved course of the spring ring 5, is separated from a second end 7 of the spring ring 5 by one and a half turns relative to the rotational axis 2. The spring ring 5 is made of metal, such that the spring ring 5 is an inherently elastic body. In particular the spring ring 5 is designed to be stressed by bending, which can in particular be caused by forces acting in the circumferential direction on its first end 6 and its second end 7.

On the first spur gear 3 and in the same way also on the second spur gear 4, in each case a recess 9 is formed. This is a groove of circular curved shape made in the material of the spur gear 3, 4. At circumferential ends of the recess 9 in each case a contact surface 10 is formed, and starting from this contact surface the recess 9 has a smoothly decreasing axial depth, like a ramp. Thus, starting from the contact surface 10 the axial depth of the recess 9 decreases along its curved length, so that after approximately half a turn (about the rotational axis 2) it reaches a depth of zero and therefore runs out altogether. Thus, the recess in each of the two spur gears 3, 4 has an approximately semicircular curved shape and forms a smoothly declining groove base. It should be commented that otherwise than in the example shown, the recess 9 can extend all the way along.

The recesses 9 formed in the two spur gears 3, 4 are formed in the axial surfaces of the spur gears 3, 4 that face one another. Relative to a circumferential direction 8 indicated in FIG. 1 by a rotation direction arrow, the first end 6 of the open spring ring 5—in the fitted condition—is supported in the circumferential direction 8 against the spur gear 3 on the contact surface 10 formed on the latter. The second end 7 of the open spring ring 5 is supported—again in the assembled condition—in the direction opposite to the circumferential direction 8 against the contact surface 10 formed on the second spur gear 4.

Figure 2:
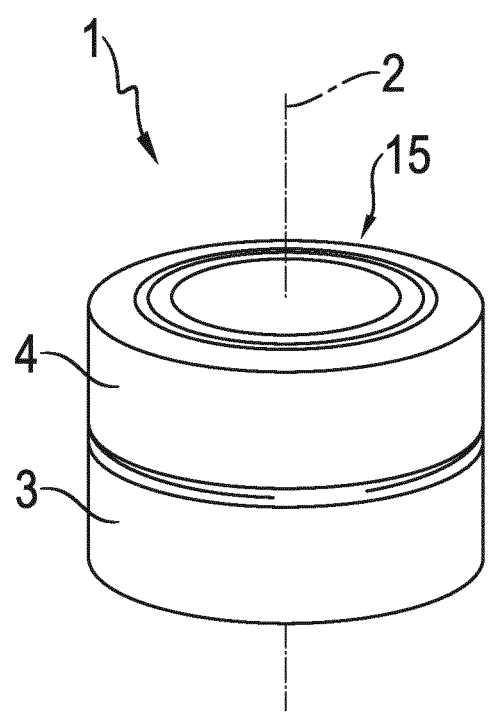
FIG. 2: The gearwheel of the first embodiment in the assembled condition, viewed in perspective obliquely from above.
Figure 3:
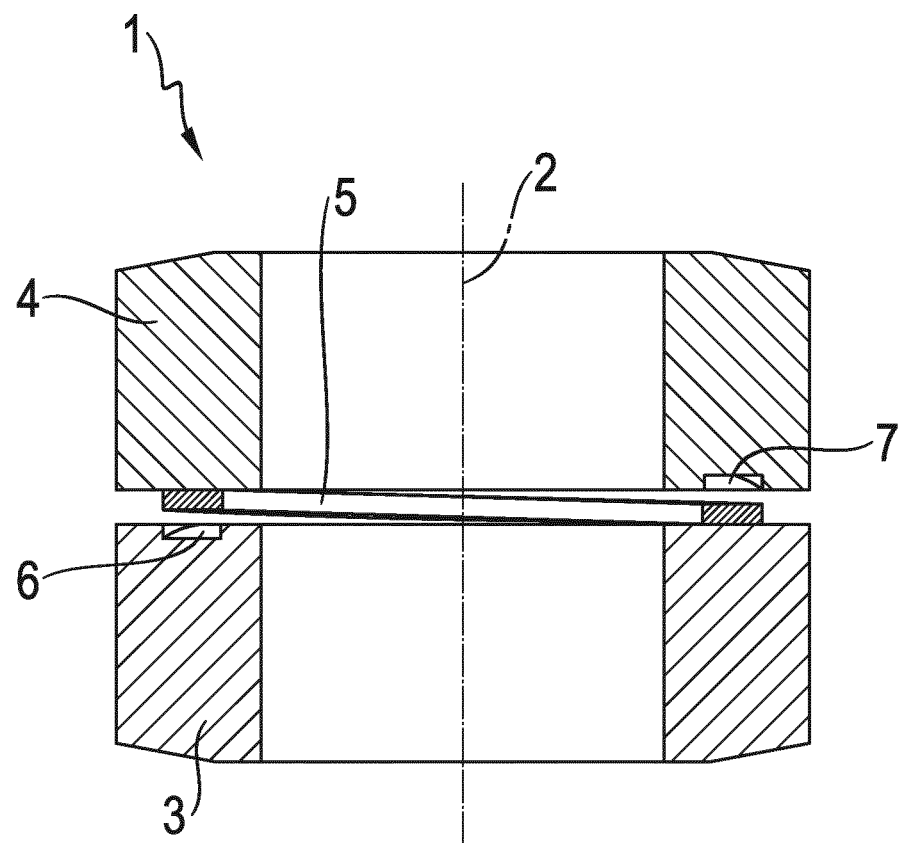
FIG. 3: The gearwheel of the first embodiment, viewed in section from the side.

The assembled condition of the gearwheel 1 is shown in FIGS. 2 and 3. To mount the gearwheel 1 on a common rotational axis 2, each of the spur gears 3, 4 has a cylindrical opening 15 in the form of a bolt-hole, so that a bearing bolt can be passed through the spur gears 3, 4 along the rotational axis 2, on which bolt the spur gears 3, 4 can be fitted to rotate, for example by means of roller or slide bearings. It can be seen from FIG. 3 that the spring ring 5 is at least partially sunk into the recess 9 of the first spur gear 3 and into the recess 9 of the second spur gear 4. Thus, despite the presence of the spring ring 5 the gearwheel 1 has a comparatively small axial thickness, so that the tooth flank width that can be used for the transmission of torque is comparatively large relative to the structural depth of the gearwheel 1.

Since in the gearwheel 1 shown the first end 6 is supported in the circumferential direction 8 against the first spur gear 3 and the second end 7 is supported in the opposite direction against the second spur gear 4, by rotating the spur gears 3, 4 relative to one another about their common rotational axis 2 the spring ring 5 is stressed so as to exert an oppositely directed restoring torque upon the spur gears 3, 4. To stress the ring 5, according to the representation in FIG. 1 the first spur gear 3 is rotated about the rotational axis 2 in the circumferential direction 8 when the second spur gear 4 remains in its rotational position as illustrated. By virtue of the relative rotation of the spur gears 3, 4 with respect to one another, the open spring ring 5 is deformed out of its original (not-deformed) condition and in particular, due to the action of circumferential force on the first end 6 and the second end 7, it is radially expanded. Due to its elastic deformation the spring ring 5 develops a restoring force which acts upon the spur gears 3, 4 as a restoring torque. In the condition last described, the first spur gear 3 and the second spur gear 4 of the gearwheel 1 are braced against one another.

Figure 10:
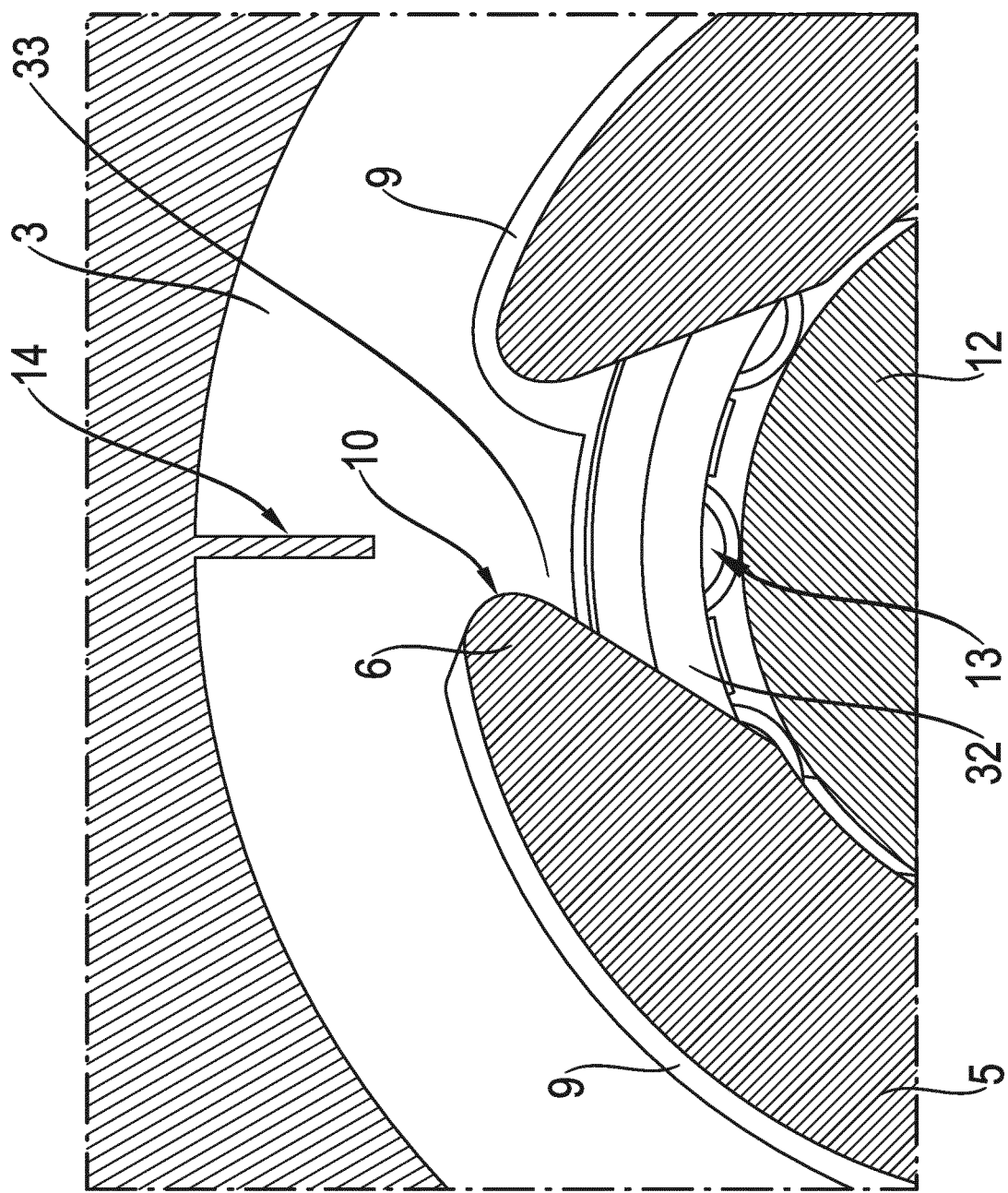
FIG. 10: A detailed view of the gearwheel of the second embodiment shown in FIGS. 4 to 7.

FIGS. 4 to 7 and also FIG. 10 show various views of a gearwheel 1 according to a second embodiment of the invention. This again is a gearwheel which is particularly suitable for fitting as a planetary wheel of a planetary gear system. The basic structure of the gearwheel 1 according to the second embodiment is similar to that of the gearwheel 1 of the first embodiment. Thus, to avoid repetition reference should be made where appropriate to the description already given. It should also be mentioned that features of the second embodiment are the same as those of the first embodiment identified with the same indexes, unless described differently in what follows.

Figure 4:
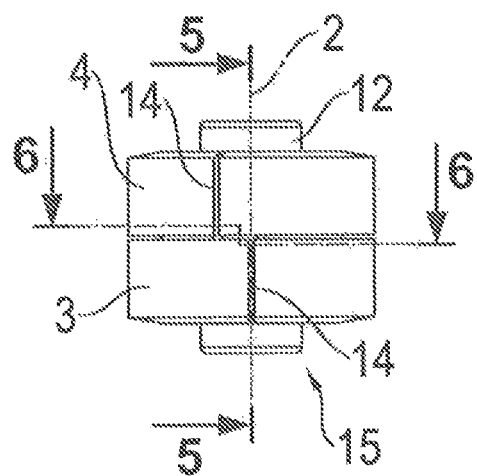
FIG. 4: A gearwheel for a planetary gear system according to a second embodiment of the invention, in the assembled condition viewed from the side.

FIG. 4 shows the gearwheel 1 of the second embodiment in the assembled condition, as viewed from the side. Again, the gearwheel 1 consists of a first spur gear 3 and a second spur gear 4, which are axially a distance apart from one another along a common rotational axis 2. Also visible is a bearing bolt 12 that passes through the cylindrical opening 15 that forms the bolt-hole from the first spur gear 3 through to the second spur gear 4. The bearing bolt 12 is axially longer than the gearwheel 1 and therefore projects axially at each end beyond the gearwheel 1. Teeth 14 formed on the spur gears 3, 4 are indicated symbolically, in each case by a thick line.

Figure 5:
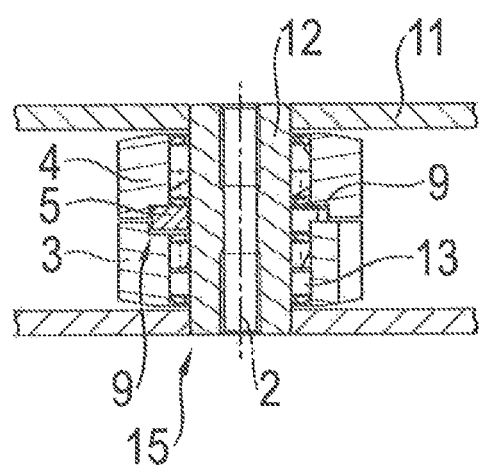
FIG. 5: The gearwheel according to the second embodiment, viewed along the section 5-5 in FIG. 4, in the additionally indicated fitted condition.

FIG. 5 shows the gearwheel 1 of the second embodiment, this time viewed in section. Furthermore the fitted condition of the gearwheel 1 in a planetary carrier is indicated, for which purpose a housing 11 of the planetary carrier is shown in part, wherein the bearing bolt 12 is press-fitted into axially opposite holes of the housing 11 of the planetary carrier. Each of the spur gears 3, 4 is mounted to rotate relative to the bearing bolt 12 by means of a needle bearing 13. Basically just as in the first embodiment, a spring ring 5 is arranged between the first spur gear 3 and the second spur gear 4 and for this, in each case a recess 9 is formed in the material of the spur gears 3, 4. Otherwise than in the first embodiment, however, in the gearwheel 1 according to the second embodiment the recesses 9 are in each case so arranged that relative to the radial extension of the spur gears 3, 4 these are immediately adjacent to the cylindrical opening 15. Thus, the recesses 9 in the spur gears 3, 4 are not formed as a groove in the narrower sense, since on its inner side they is not bounded by the material of the spur gear 3, 4 concerned.

This design makes it possible for the spring ring 5 to have a smaller inside diameter than the opening 15 formed in the spur gears 3, 4. In particular, the spring ring 5 with its inside circumferential surface is adjacent to the bearing bolt 12. The design allows the spring ring 5 to be used for the axial securing of the needle bearing 13 of the first and second spur gears 3, 4.

Figure 6:
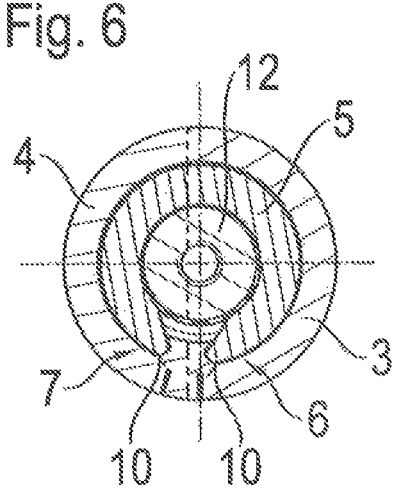
FIG. 6: The gearwheel according to the second embodiment, viewed along the section 6-6 in FIG. 4, FIG. 7: The gearwheel according to the second embodiment, viewed in perspective obliquely from above, with the second spur gear omitted.

FIG. 6 shows the gearwheel 1 of the second embodiment in a section taken along 6-6 in FIG. 4, viewed from above. In correspondence with the shape of the section (a stepped section), in the outer part on the left of FIG. 6 the second spur gear 4 can be seen, whereas in the part of the drawing on the right of the step in the section (indicated by the broken line on the left of the centerline) the first spur gear 3 can be seen on the outside. The figure shows that in this gearwheel 1 according to the second embodiment of the invention, the open spring ring 5 is designed differently than in the first embodiment. It has an open ring body which, however, in contrast to the first embodiment, comprises less than one turn. A first end 6 of the spring ring 5 is supported against the first spur gear 3 on a contact surface 10 formed there, which is designed to be approximately complementary to the lug-shaped end 6 of the spring ring 5. The engagement of the lug-shaped end 6 of the spring ring in the pocket-shaped contact surface 10 of the first spur gear 3 can also be seen in FIG. 7, which shows a perspective view of the gearwheel 1 according to the second embodiment seen obliquely from above; for a clearer representation the second spur gear 4 has been omitted.

Figure 7:
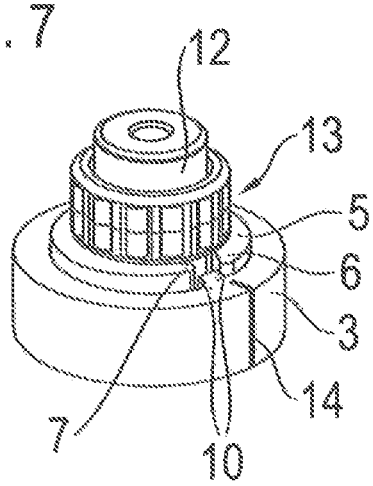

It can also be seen in FIG. 7 that the spring ring 5—in its relaxed condition as shown—has a certain axial gradient. In other words, with reference to the rotational axis 2 the first end 6 of the spring ring is offset in the axial direction relative to the second end 7 of the spring ring 5. Due to this axial gradient the second end 7 of the spring ring 5 reaches a position in the axial direction in which it projects out of the first spur gear 3. In the assembled condition shown in FIGS. 4, 5 and 6 the spring ring 5 is partially held in a recess 9 formed in the second spur gear 4 on its side facing toward the first spur gear 3. Like the first end 6 of the spring ring 5, the second end 7 of the spring ring 5 is also lug-shaped. As can be seen in FIG. 6, the second end 7 of the spring ring 5 is supported in a pocket-shaped contact surface 10 which is shaped in the second spur gear 4 to fit the end 7 of the spring ring 5.

The function and mode of operation of the gearwheel 1 according to the second embodiment are similar to the gearwheel 1 of the first embodiment. In the gearwheel 1 according to the second embodiment as well, rotating the spur gears 3, 4 relative to one another about their common rotational axis 2 stresses the spring ring 5 so that it exerts a restoring torque on the spur gears 3, 4.

In the second embodiment illustrated, over its circumferential shape the spring ring 5 has an essentially constant radial width. Only in the area of the first and second ends 6, 7 does the radial width of the spring ring 5 decrease. When stressed in the course of operation the spring ring 5 is loaded in particular by bending. According to a load-optimized design, in contrast to the representation shown in FIG. 6 the spring ring 5 could be made such that only in a central area remote from the opening (the ends 6, 7) does it have a maximum radial width, starting from which, however, its radial width decreases continuously toward the ends 6 and 7.

Due to the already described axial gradient of the spring ring 5, as can be seen from FIG. 7 the first end 6 and the second end 7 of the spring ring 5 are axially offset relative to one another. First of all, this makes it possible for the first end 6 to be supported in the circumferential direction exclusively against the first spur gear 3, while the second end 7 is supported in the circumferential direction exclusively against the second spur gear 4.

Advantageously, the axial gradient of the spring ring 5 also enables the gearwheel 1 to achieve some play compensation. Namely, in the fitted connect of the gearwheel 1 the spring ring exerts axial pressure between the first spur gear 3 and the second spur gear 4. This is because at least in the area of its first end 6 the spring ring 5 is in contact in the axial direction with the first spur gear 3, whereas the second end 7 of the spring ring is in contact in the axial direction with the second spur gear 4. The sizes of the recesses 9 formed in the spur gears 3, 4 and of the spring ring 5 are chosen such that in the fitted condition of the gearwheel 1 in a housing 11 of a planetary carrier (see FIG. 5), the spring ring 5 is slightly compressed in the axial direction. By virtue of its elasticity the spring ring 5 develops a corresponding restoring force and therefore pushes the spur gears 3, 4 outward against the housing 11, so reducing or even eliminating the play.

Since the force of the spring ring 5 in the axial direction on the first spur gear 3 and the second spur gear 4 is applied in the same circumferential area (in the area of the teeth 14 indicated in FIG. 7), the restoring force of the spring ring 5 acting in the axial direction also brings about a (slight) tilting of the first and second spur gears 3, 4 relative to the rotational axis 2. Advantageously, this tilting can reduce or even eliminate any bearing play in the needle bearing 13.

It should be commented that the above-described play compensation (by displacement in the axial direction and/or tilting relative to the rotational axis) takes place only to a very slight extent. This amount, however, can be enough to avoid otherwise occurring noise during operation, caused by play-related movements of the spur gears 3, 4, for example during load changes or in the load-free condition of the planetary gear system.

The representation in FIG. 10 shows further details of the gearwheel according to the second embodiment. The figure shows a detailed section which in particular describes the contact situation between the open spring ring 5 and a spur gear, in this case the first spur gear 3. The second spur gear 4 cannot be seen in this view. Again, it can be seen that the first end 6 of the spring ring 5 is supported against the first spur gear 3 on the contact surface 10 formed on the latter. Better than in FIG. 6, it can be seen that the first end 6 of the spring ring 5 is lug-shaped. The lug on the first end 6 of the spring ring 5 in contact with the contact surface 10 has a radius and extends tangentially to the radial inside. The contact surface 10 formed on the spur gear 3 forms an approximately complementary pocket in relation to the first end 6 of the spring ring 5, which holds the lug. The pocket also has a radius and is also tangential to the radial inside. The tangential shape of the pocket toward the inside of the radius forms a contour 33 like an undercut. This undercut prevents any slipping of the first end 6 of the spring ring 5 in the radial direction (so that the lug-shaped end 6 is secured radially).

The radius of the pocket formed in the spur gear 3 should be at least equal to or larger than the radius at the first end 6 of the spring ring 5. In the embodiment shown in FIG. 10 the radii of the pocket and the lug are equal. Thus, a large (curved) contact area is formed between the spur gear 3 and the spring ring 5 so that, advantageously, only a small surface pressure is produced in the material of the spur gear 3 and the spring ring 5.

Alternatively to the design shown, the radius of the pocket could be at least slightly larger than the radius of the lug-shaped end of the spring ring. This would ensure that under load—and due to the deformation produced thereby—the spring ring could roll on the pocket-shaped contact surface of the spur gear in a linear manner (i.e. forming a linear contact). By virtue of an only linear contact the areal friction and therefore the stick-slide risk ("stick slip") between the spur gear and the spring ring is minimized. However, the radii of the pocket and lug should then, also advantageously, be only slightly different so that in the event of high loading the surface pressure does not reach a critical value and no plastic deformation takes place. Rather, the design should then make it possible for a larger contact area to be produced by elastic deformation so that the surface pressure is reduced.

Finally, it can be seen in FIG. 10 that the circular-curved recess 9 that holds the spring ring 5 has a slightly larger diameter than the spring ring 5 itself has at its outer circumference. An ring-section-shaped free space produced thereby and partly visible in FIG. 10 makes it possible for the spring ring 5 to bend without impediment under load. The spring ring 5 is axially adjacent to the needle bearing 13, whose needle bearing cage 32 is partly visible in FIG. 10. In the circumferential direction the spring ring 5 contacts the spur gear 3 exclusively with its first end 6 in the area of the contact surface 10. With its second end 7, in the circumferential direction the spring ring 5 contacts the spur gear 4 exclusively (see FIGS. 4 to 7).

To illustrate the field of use of the gearwheel described above, FIG. 8 shows a schematic view of an adjustable roll stabilizer 20. The roll stabilizer 20 is part of a chassis (not shown completely) of a vehicle (not shown). A first wheel 21a and a wheel 21b arranged on the opposite side of the vehicle are each connected to the body of the vehicle by way of respective transverse control arms 22a, 22b and further chassis components (not shown here for the sake of simplicity). Thus, the wheel 21a and the transverse control arm 22a, and the wheel 21b and transverse control arm 22b, form in each case a wheel suspension. Each of these wheel suspensions is coupled to an end of an associated stabilizer half 23a or 23b, respectively, of the adjustable roll stabilizer 20. The two stabilizer halves 23a and 23b are connected to one another by an actuator 24 in the middle of the vehicle.

In a manner known as such, the roll stabilizer 20 is mounted by way of an axis 25 so that it can rotate relative to the vehicle body (not shown). The actuator 24, here represented for simplicity as a cylindrical body, comprises essentially a housing, an electric motor and a gear system. The stabilizer halves 23a and 23b are in driving connection with one another via the electric motor and the gear system. When the electric motor is static the two stabilizer halves 23a, 23b are connected to one another in a fixed manner in the area of the actuator 24. When the electric motor is operated, depending on the rotational direction of the electric motor the stabilizer halves 23a, 23b can rotate relative to one another about the axis 25. Thus, the roll stabilizer 20 can be adjusted in a manner known as such.

The gear system present in the actuator 24 typically comprises several stages of planetary gearsets. In particular the driving planetary gearset on the drive output side, which is therefore connected rotationally fixed to one of the two stabilizer halves, is exposed to high torques for mechanical reasons. Thus, among other things high demands are imposed on the design of the planetary gearwheels of this drive output-side planetary stage.

Figure 8:
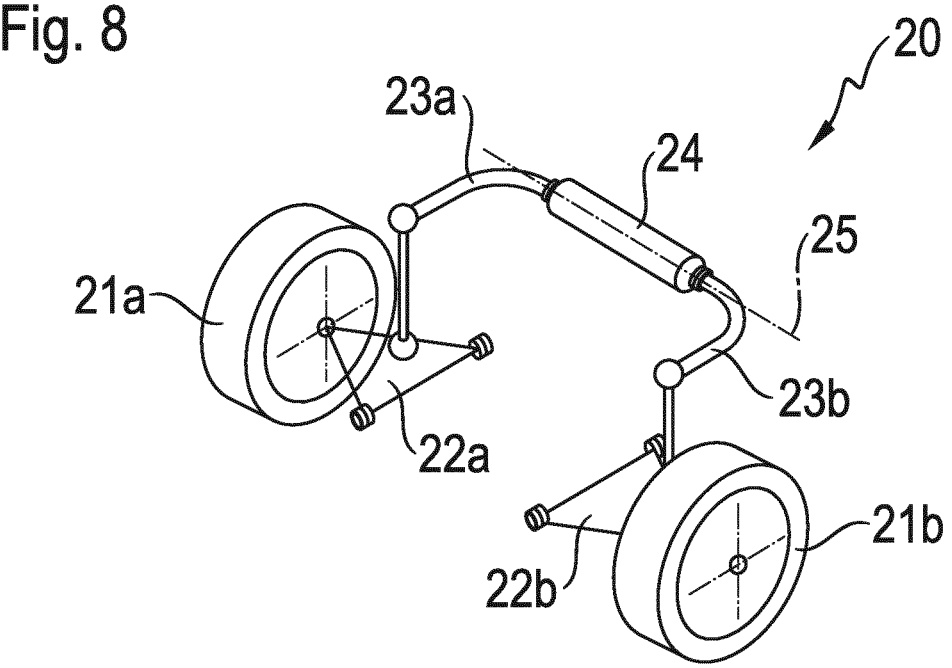
FIG. 8: A schematic view of an adjustable roll stabilizer, which is articulated to respective opposite wheel suspensions of a vehicle.
Figure 9:
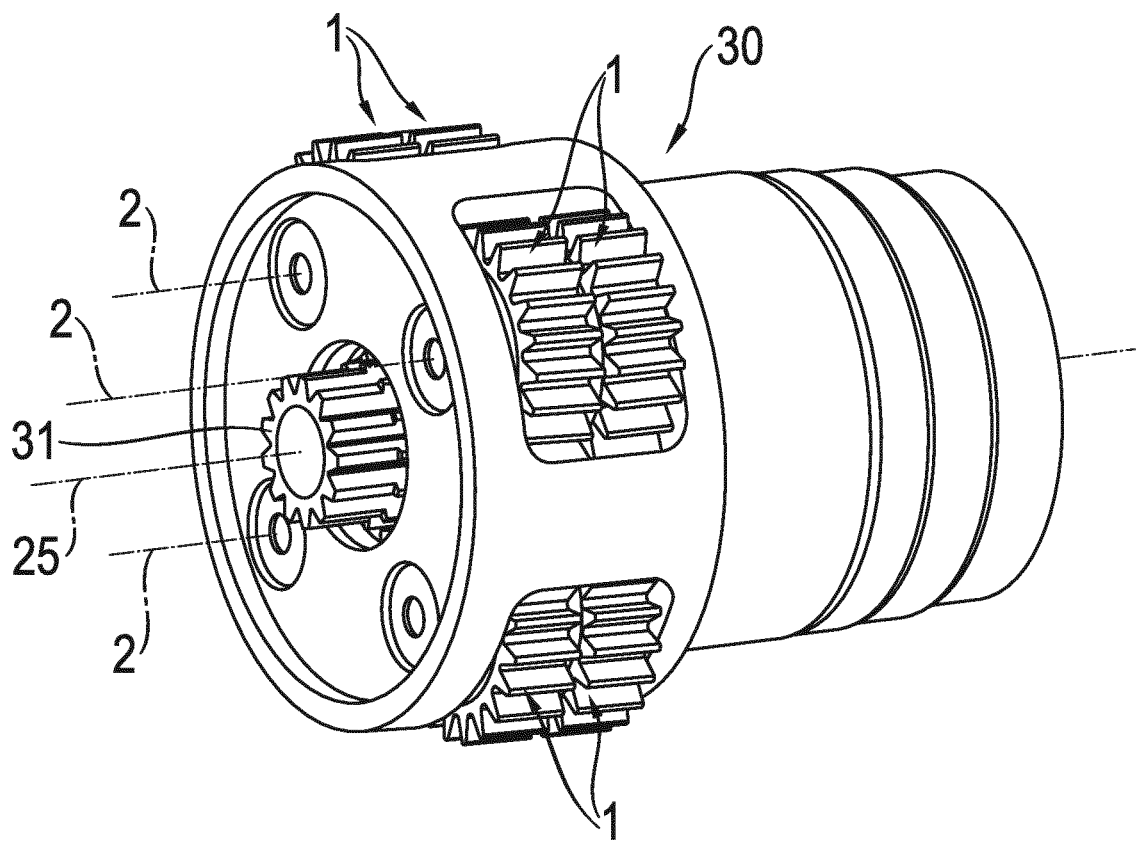
FIG. 9: A planetary carrier which can be incorporated as part of a planetary gear system in an adjustable roll stabilizer as shown in FIG. 8, and in which a plurality of gearwheels according to the invention are fitted.

For illustrative purposes FIG. 9 shows a planetary carrier 30 which can be part of a drive output side planetary stage of an adjustable roll stabilizer 20 as illustrated schematically in FIG. 8. On the axis 25, which corresponds to the rotational axis of the roll stabilizer 20 according to FIG. 8, there is arranged an input pinion 31. This input pinion 31 is made integrally with a sun gear arranged inside the planetary carrier 30, which sun gear is covered by the planetary carrier 30 in the representation shown in FIG. 9. In the embodiment shown, around the sun gear are arranged a total of four gearwheels 1 (alternatively, three, or more than four gearwheels could be arranged around the sun gear), each of them mounted to rotate about a rotational axis 2 relative to the planetary carrier 30. The gearwheels 1 in each case mesh with the central sun gear. In the fitted condition of the planetary carrier 30 in the housing of the actuator 24 (see FIG. 8), the four gearwheels 1 also mesh with a ring gear formed by the inner housing wall.

As can be seen from FIG. 9, the four gearwheels 1 of the planetary carrier 30 are gearwheels which are divided into a first and a second spur gear axially a distance apart from one another along a common rotational axis 2. Advantageously, and thereby achieving the above-described effects, the planetary carrier 30 is fitted with gearwheels 1 according to the invention as described above. These can be designed, for example, according to the first embodiment (FIGS. 1 to 3) or according to the second embodiment (FIGS. 4 to 7).

INDEXES

1 Gearwheel
2 Rotational axis
3 First spur gear
4 Second spur gear
5 Open spring ring
6 First end
7 Second end
8 Circumferential direction
9 Recess
10 Contact surface
11 Housing of the planetary carrier
12 Bearing bolt
13 Needle bearing
14 Teeth (indicated schematically)
15 Opening
20 Roll stabilizer
21a Wheel
21b Wheel
22a Transverse control arm
22b Transverse control arm
23a Stabilizer half
23b Stabilizer half
24 Actuator
25 Axis
30 Planetary carrier
31 Input pinion
32 Needle bearing cage
33 Contour

The invention claimed is:

1. A gearwheel for a gear system, the gearwheel comprising:
first and second spur gears, the gearwheel being divided into at least the first spur gear and the second spur gear which are spaced apart from one another along a common rotational axis, the first and the second spur gears have axial end faces that axially face each other,
an open spring ring with a first end which is supported, in a circumferential direction, against the first spur gear, and a second end which is supported, in a direction opposite to the circumferential direction, against the second spur gear, in such manner that by rotating the first and the second spur gears relative to one another about the common rotational axis, the spring ring is stressed in order to exert a restoring torque on the first and the second spur gears, and a recess is formed on at least one of the first and the second spur gears to hold part of the spring ring, and an entirety of the spring is arranged axially between the axial end face of the first spur gear and the axial end face of the second spur gear.

2. The gearwheel according to claim 1, wherein the recess is formed on the axial end faces of the first spur gear and the second spur gear.

3. The gearwheel according to claim 1, wherein the recess holds at least one of the first and the second ends of the spring ring and has a contact surface against which the held end of the at least one of the first and the second ends is supported.

4. The gearwheel according to claim 3, wherein the contact surface is pocket-shaped in order to hold the at least one of the first and the second ends, and the at least one of the first and the second ends of the spring ring is lug-shaped to fit with the contact surface.

5. The gearwheel according to claim 4, wherein the contact surface has a radius which is either equal to, or at least slightly larger than, a radius of the lug-shaped end of the spring ring.

6. The gearwheel according to claim 1, wherein the recess has a circular-curved shape and is concentric with the first and the second spur gears, the recess being axially defined by a first surface of the axial end face of the first spur gear and a second surface of the axial end face of the second spur gear, the first and the second surfaces extend in the circumferential direction about the common rotational axis.

7. The gearwheel according to claim 1, wherein the first and the second spur gears each have an approximately cylindrical opening so as to be mounted on the common rotational axis that passes axially through the first and the second spur gears.

8. The gearwheel according to claim 7, wherein, relative to a radial extent of the first and the second spur gear, the recess is immediately adjacent to the approximately cylindrical openings.

9. The gearwheel according to claim 7, wherein the spring ring has a smaller inside diameter than the approximately cylindrical openings formed in the first and the second spur gears so that the spring ring facilitates axially securing one of the first and the second spur gears.

10. The gearwheel according to claim 1, wherein the recess is formed as a groove in a material of the first and the second spur gear.

11. The gearwheel according to claim 1, wherein an axial depth of the recess is constant over its length.

12. The gearwheel according to claim 1, wherein the spring ring has less than one turn.

13. The gearwheel according to claim 1, wherein the spring ring has more than one turn.

14. The gearwheel according to claim 1, wherein in a relaxed condition the spring ring has an axial gradient so that, when the gearwheel is fitted in a housing of a planetary carrier to compensate for play, the first and the second spur gears are at least one of pushed apart and tilted relative to the common rotational axis.

15. A gearwheel for a gear system, the gearwheel comprising:

first and second spur gears, the gearwheel being divided into at least the first spur gear and the second spur gear which are spaced apart from one another along a common rotational axis, an open spring ring with a first end which is supported, in a circumferential direction, against the first spur gear, and a second end which is supported, in a direction opposite to the circumferential direction, against the second spur gear, in such manner that by rotating the first and the second spur gears relative to one another about the common rotational axis, the spring ring is stressed in order to exert a restoring torque on the first and the second spur gears, a recess is formed on at least one of the first and the second spur gears to hold part of the spring ring, and starting from a contact surface for the respective first and the second ends of the spring ring, the recess has an axial depth which decreases smoothly in a manner of a ramp.

16. A gearwheel for a planetary gear system, the gearwheel comprising:

a first spur gear having an axial end face and a second spur gear having an axial end face, the first and the second spur gears being coaxially aligned with one another along a common rotational axis such that the axial end face of the first spur gear axially faces the axial end face of the second spur gear and the first and the second spur gears are axially spaced apart from one another by a gap;

an open spring ring being supported in the gap, entirely between the axial end faces of the first and the second spur gears, and the open spring ring having first and second ends;

the first end of the open spring ring being received within a recess in the first spur gear, and the recess in the first spur gear retaining the open spring ring in a first circumferential direction against the first spur gear; and the second end of the open spring ring being received within a recess in the second spur gear, and the recess in the second spur gear retaining the open spring ring in a second circumferential direction, which is opposite the first circumferential direction, against the first spur gear, such that rotation of the first and the second spur gears, relative to one another about the common rotation axis, stresses the spring ring to exert a restoring torque on the first and the second spur gears.

* * * * *